Patented Feb. 9, 1943

2,310,395

UNITED STATES PATENT OFFICE 2,310,395

RICINOLEIC ACID DERIVATIVES

Thomas F. Carruthers, South Charleston, W. Va., assignor to Carbide and Carbon Chemicals Corporation, a corporation of New York No Drawing. Application February 16, 1939, Serial No. 256,725

10 Claims. (Cl. 260—410)

This invention is concerned with a group of novel, high-boiling ester compounds, and it includes the process of making them. The compounds of this invention are acylated ricinoleic acid esters of the monoalkyl and monoaryl ethers of the alkylene and polyalkylene glycols. They may be described more particularly as compounds of the probable general formula:

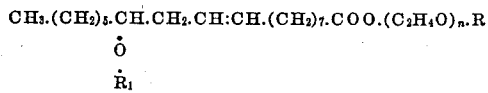

in which $n$ is a small whole number, R is an alkyl or aryl group, and $R_1$ is a monovalent acyl group. While a particular form of the radical of ricinoleic acid is indicated in the above formula, it is to be understood that possible structural isomers of this radical are included within the invention; and both the particular form shown and such variations as may exist are designated by the terms "ricinoleic acid" or "ricinoleate" as used throughout this specification and in the appended claims.

The new compounds of this invention are useful for many purposes where high-boiling stable liquids are required, and they are particularly valuable as plasticizers or solvents for resinous and plastic materials, such as the vinyl resins, and various cellulose derivatives. They are distinguished from previously known derivatives of ricinoleic acid by their improved plasticizing or softening action when used in plastic compositions, and they are characterized by a marked increase in compatibility with such materials as the vinyl resins, and in particular with the conjoint polymers of vinyl halides with vinyl esters of lower aliphatic acids.

The compounds of this invention are made by an ester exchange between the glycol ethers and the glyceryl ricinoleates of castor oil in the presence of alkali metal alcoholate catalysts. The catalysts preferably are the monoglycol or polyglycol alkali metal monoethers corresponding to the glycol ether being esterified. The alkali metal alcoholate used as the catalyst may be formed by the reaction of the alkali metal and an alcohol, or, in the case of the preferred glycol alkali metal monoethers, it may be prepared by heating the alkali metal hydroxide with the glycol ether, followed by removal of the water liberated in this reaction. Only a small amount of catalyst is needed, and it may range from about 0.1% upwardly to about 2.0% by weight, calculated as alkali metal and based on the castor oil supplied to the reaction. Catalyst amounting to about 0.5% to 1.0% of alkali metal based on the weight of the castor oil enables the reaction to be carried out easily, and such quantities may be conveniently employed. The reaction takes place readily at 50° C., and becomes quite rapid at temperatures approaching 100° C. Temperatures of about 60° to 80° C. have been found to be desirable and may be conveniently employed. The reaction appears to be virtually complete under the conditions described, and, assuming castor oil to be the pure glyceryl ester of ricinoleic acid (which it is not), yields of around 90% of the theoretical or slightly better are easily secured. Following the formation of the ester by this reaction, the hydroxyl group of the ricinoleic acid radical is acylated by reaction with an acid anhydride to improve and modify the solvent properties of the compound.

The invention will be illustrated by the following specific examples:

EXAMPLE I.—*Ethylene glycol monobutyl ether acetyl ricinoleate (butoxyethyl acetyl ricinoleate)*

A solution of ethylene glycol sodium monobutyl ether was prepared by dissolving 6 parts by weight of sodium metal in 254 parts by weight of ethylene glycol monobutyl ether (beta-butoxy ethanol). To this solution was added 180 parts by weight of benzene, and the solution was then heated to 70° C. Castor oil in the amount of 467 parts by weight was stirred into this solution, and the temperature of the reaction mixture was maintained at from 70° to 80° C. for 30 minutes. It will be seen that the catalyst used, calculated as metallic sodium, amounted to 1.3% of the weight of the castor oil. The reaction mixture was then poured into hot water containing sufficient acetic acid to make the entire mixture neutral. The neutralized mixture was allowed to separate into two layers, and the upper layer containing the product was removed and reacted with acetic anhydride by heating it with the anhydride at 120° C. for 30 minutes. The amount of acetic anhydride used was 306 parts by weight (3 moles). The product was recovered by distilling out the benzene and excess reagents under reduced pressure. The product remaining amounted to 591 parts by weight, which on analysis was found to contain 90.7% of the desired ester, ethylene glycol monobutyl ether acetyl ricinoleate or beta-butoxyethyl acetyl ricinoleate. This product was a water-insoluble liquid having a specific gravity of 0.938 at 20°/20° C.

EXAMPLE II.—*Ethylene glycol monomethyl ether acetyl ricinoleate (methoxyethyl acetyl ricinoleate)*

A reaction was conducted between castor oil and ethylene glycol monomethyl ether (beta-methoxy ethanol) in the presence of ethylene glycol sodium monomethyl ether. Calculated as metallic sodium, the catalyst amounted to about 1.0% of the weight of castor oil. The amounts of materials employed in this reaction were as follows:

| | Parts by weight |
|---|---|
| Castor oil | 467 |
| Ethylene glycol monomethyl ether | 152 |
| Sodium metal | 5 |
| Benzene | 180 |
| Acetic anhydride | 204 | and the conditions and methods used were those described in Example I. The product was obtained as 516 parts by weight of a pale yellow, water-insoluble liquid which on analysis was found to contain 99.2% of the desired ester, ethylene glycol monomethyl ether acetyl ricinoleate or beta-methoxyethyl acetyl ricinoleate. Its specific gravity was 0.962 at 20°/20° C.

EXAMPLE III.—*Diethylene glycol monomethyl ether acetyl ricinoleate (methoxyethoxyethyl acetyl ricinoleate)*

An ester exchange was conducted between castor oil and diethylene glycol monomethyl ether (beta-methoxyethoxy ethanol) under the conditions and in the manner described in Example I. The catalyst in this reaction was diethylene glycol sodium monomethyl ether amounting to approximately 1.0% by weight, as sodium metal, based on the castor oil used. The specific amounts of reagents employed were:

| | Parts by weight |
|---|---|
| Castor oil | 467 |
| Diethylene glycol monomethyl ether | 300 |
| Sodium metal | 5 |
| Benzene | 180 |
| Acetic anhydride | 255 |

On analysis, the product obtained was found to contain 96.0% of the desired ester, diethylene glycol monomethyl ether acetyl ricinoleate or beta-methoxyethoxyethyl acetyl ricinoleate. The product was a yellow liquid, insoluble in water and possessing a faint odor. It had a specific gravity of 0.966 at 20°/20° C.

EXAMPLE IV.—*Ethylene glycol monophenyl ether acetyl ricinoleate (phenoxyethyl acetyl ricinoleate)*

A reaction was conducted between ethylene glycol monophenyl ether (beta-phenoxy ethanol) and castor oil, employing the method and conditions described in Example I. In this case the catalyst was ethylene glycol sodium monophenyl ether amounting to about 1.3% of the castor oil used when calculated as sodium metal. The amounts of the reagents were:

| | Parts by weight |
|---|---|
| Castor oil | 467 |
| Ethylene glycol monophenyl ether | 345 |
| Sodium metal | 6 |
| Benzene | 360 |
| Acetic anhydride | 255 |

The product obtained was a yellow-to-brown liquid in the amount of 560 parts by weight. It was found on analysis to contain 99.0% of the desired ester, ethylene glycol monophenyl ether acetyl ricinoleate or beta-phenoxyethyl acetyl ricinoleate, and to have a specific gravity of 0.989 at 20°/20° C. This product was insoluble in water and possessed a faint odor.

All of the materials prepared according to the foregoing examples were characterized by compatibility with the conjoint polymer of vinyl chloride and vinyl acetate containing 87% by weight of vinyl chloride. The products of Examples I and IV, when combined with this vinyl resin in the proportions of two parts resin and one part ester, were clear and flexible but developed a slightly greasy surface due to some sweating out of the plasticizer. The products of Examples II and III appeared to be compatible with this particular vinyl resin to a much greater extent, yielding clear and flexible films having an excellent surface. The plasticized compositions of the vinyl resin described with the products of Examples II and III are remarkable in that they have no tendency to become tacky when heated to temperatures as high as 60° C., or nearly to the initial heat distortion temperature of the resin alone as determined by A. S. T. M. methods.

In the examples given, the catalysts were shown to have been made from sodium metal and the glycol ether replacing the glycerol of castor oil. Alcoholates of other alkali metals may be used, for example, by substituting potassium metal for the sodium. While the catalysts may be the alkali metal alcoholates formed of various alcohols, including ethanol, isopropanol, butanol and the like, the alcohol radical of these compounds may enter into the reaction, and for this reason their use is generally less desirable than that of catalysts formed of the glycol ether of the primary reaction. The glycol or polyglycol alkali metal monoethers may be prepared by reacting the alkali metal hydroxide with the glycol ether and removing the water formed. However, if the alkali metal hydroxide is merely dissolved in an alcohol or glycol ether and employed as a catalyst, the reaction not only differs in the rate at which it proceeds, but also in the nature of the product formed. This is illustrated by the following:

A solution of 467 parts by weight of castor oil in 180 parts by weight of benzene was heated to 80° C. To this solution was added 114 parts by weight of ethylene glycol monomethyl ether beta-methoxy ethanol) containing 20 parts by weight of a 10% solution of sodium hydroxide in this glycol ether. The mixture was stirred and its temperature maintained at 80° C. for 10 minutes. At the end of this time no haze or precipitation occurred, as was noted in other reactions employing the alkali metal alcoholate catalyst. An additional 40 parts by weight of the solution of caustic in the glycol ether was then added to the mixture, but after an additional 30 minutes there was still no evidence of reaction. The mixture was allowed to stand overnight, at which time it was found to have set to a gel, indicating that some kind of reaction had occurred. By a series of washing and drying operations, there was isolated 400 parts by weight of product, the true nature of which could not be ascertained. It contained 10.7% free acid calculated as ricinoleic.

The benzene present in the reactions described serves chiefly to dilute the mixtures so that they remain liquid in every case. The diluent may, of course, be omitted, but since some of the reaction mixtures tend to become gels or to solidify as the reaction proceeds, it is usually desirable to have an inert liquid present to insure fluidity of the mixture. Acid anhydrides other than acetic anhydride may be used in the acylation step by the direct substitution of equivalent amounts of such materials as propionic, butyric, hexoic or benzoic anhydrides in the reaction. So far as has been determined at present, it is necessary to use acid anhydrides in the acylation of the hydroxyl group of these ricinoleic acid esters since the acids themselves under the usual esterification conditions seem incapable of causing sufficient acylation.

Various glycol and polyglycol monoalkyl or monoaryl ethers other than those described in the examples may be employed in the reactions of this invention, and it will be apparent that the compounds and the reaction described are susceptible of modification in various ways. These modifications are included within the invention as defined by the appended claims.

I claim:

1. As chemical compounds, ricinoleic acid derivatives of alkylene and polyalkylene glycol monoalkyl and monoaryl ethers having the probable general formula

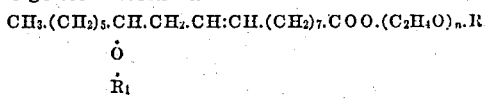

in which $n$ is a small whole number, R is of the group consisting of alkyl and aryl radicals and $R_1$ is a monovalent acyl group.

2. As chemical compounds, ricinoleic acid derivatives of alkylene and polyalkylene glycol monoalkyl and monoaryl ethers having the probable general formula

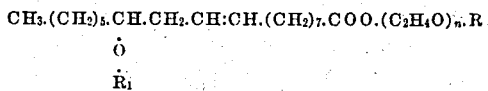

in which $n$ is a small whole number, R is of the group consisting of alkyl and aryl radicals and $R_1$ is an acetyl group.

3. As chemical compounds, ricinoleic acid derivatives of alkylene and polyalkylene glycol monoalkyl and monoaryl ethers having the probable general formula

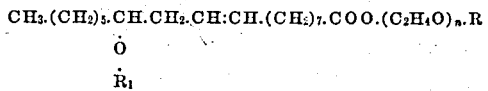

in which $n$ is an integer from 1 to 2, R is of the group consisting of alkyl and aryl radicals and $R_1$ is an acetyl group.

4. As chemical compounds, ricinoleic acid derivatives of alkylene and polyalkylene glycol monoalkyl and monoaryl ethers having the probable general formula

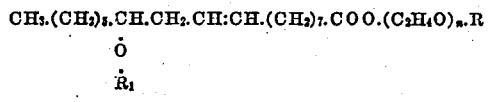

in which $n$ is an integer from 1 to 2, R is of the group consisting of methyl, ethyl, butyl and phenyl radicals, and $R_1$ is an acetyl group.

5. As a chemical compound, beta-butoxyethyl acetyl ricinoleate, which compound is a water-insoluble liquid having a specific gravity of about 0.938 at 20°/20° C.

6. As a chemical compound, beta-methoxyethyl acetyl ricinoleate, which compound is a water-insoluble liquid having a specific gravity of about 0.962 at 20°/20° C.

7. As a chemical compound, beta-methoxyethoxyethyl acetyl ricinoleate, which compound is a water-insoluble liquid having a specific gravity of about 0.966 at 20°/20° C.

8. Process for making acylated ricinoleic acid esters of a glycol monoether of the group consisting of alkylene glycol monoalkyl ether, alkylene glycol monoaryl ether, polyalkylene glycol monoalkyl ether and polyalkylene glycol monoaryl ether, which comprises reacting said ethers with castor oil in the presence of an alkyli metal alcoholate catalyst at temperatures between about 50° and about 100° C., and thereafter acylating the product obtained with an acid anhydride.

9. Process for making acylated ricinoleic acid esters of a glycol monoether of the group consisting of alkylene glycol monoalkyl ether, alkylene glycol monoaryl ether, polyalkylene glycol monoalkyl ether and polyalkylene glycol monoaryl ether, which comprises reacting said ethers with castor oil at temperatures between about 50° and about 100° C. in the presence of a catalyst which is a glycol alkali metal monoether corresponding to the glycol ether being reacted, and thereafter acylating the resulting product by reaction with an aliphatic acid anhydride.

10. Process for making acylated ricinoleic acid esters of a glycol monoether of the group consisting of alkylene glycol monoalkyl ether, alkylene glycol monoaryl ether, polyalkylene glycol monoalkyl ether and polyalkylene glycol monoaryl ether, which comprises reacting said ethers with castor oil at temperatures between about 60° and about 80° C. in the presence of a catalyst which is a glycol alkali metal monoether corresponding to the glycol ether being reacted, and thereafter acylating the resulting product by reaction with acetic anhydride.

THOMAS F. CARRUTHERS.